United States Patent Office 3,847,978
Patented Nov. 12, 1974

3,847,978
PERFLUORINATED LINEAR POLYETHERS HAVING REACTIVE TERMINAL GROUPS AT BOTH ENDS OF THE CHAIN AND PROCESS FOR THE PREPARATION THEREOF
Dario Sianesi and Gerardo Caporiccio, Milan, and Domenico Mensi, Breno, Italy, assignors to Montecatini Edison S.p.A., Milan, Italy
No Drawing. Continuation-in-part of abandoned application Ser. No. 787,309, Dec. 26, 1968. This application June 18, 1969, Ser. No. 834,486
Claims priority, application Italy, July 1, 1968, 817,809/68
Int. Cl. C07c *59/22*
U.S. Cl. 260—535 H           25 Claims

ABSTRACT OF THE DISCLOSURE

Bifunctional perfluorinated linear polyethers having chemically reactive terminal groups at each chain terminal and no peroxidic oxygen in the chain are obtained from perfluorinated linear polyethers containing peroxidic oxygen bridges, by chain cleavage at the peroxidic oxygen sites, by reacting the peroxidic oxygen-containing polyethers with a reducing agent at temperatures of about −30° C. to +250° C. under pressures of about 1 to 200 atmospheres.

CROSS-REFERENCE TO RELATED APPLICATION

This application is a continuation-in-part of our application Ser. No. 787,309, filed Dec. 26, 1968, now abandoned.

BACKGROUND OF THE INVENTION

1. Field of the Invention

The present invention relates to a new class of perfluorinated linear polyethers with reactive functions at both ends of the chain and to a process for the preparation thereof.

2. Description of the Prior Art

In prior patent applications, including applications Ser. Nos. 446,292, filed Apr. 7, 1965, now U.S. Pat. No. 3,442,942 issued May 6, 1969; 576,846, filed Sept. 2, 1966 now U.S. Pat. No. 3,450,611, issued June 17, 1969; 650,257, filed June 30, 1967, now abandoned; 651,128, filed July 5, 1967, now U.S. Pat. No. 3,513,203, issued May 19, 1970; 702,533, filed Feb. 2, 1968; and 718,223, filed Apr. 2, 1968, now U.S. Pat. No. 3,665,041, issued May 23, 1972, all of which are assigned to the assignee hereof, there have been described perfluorinated linear polyethers and copolyethers and mixtures thereof characterized by a very high molecular weight, by containing peroxidic groups and by having at both ends or terminals of the chain either two functional groups, or one functional and one neutral group, or two neutral groups.

SUMMARY OF THE INVENTION

We have now discovered that it is possible to convert these products into new polyethers, including copolyethers, of a lower molecular weight and into mixtures thereof, which new products do not contain peroxidic groups and have functional groups at both ends of the chain.

Thus, the present invention provides a new class of bifunctional perfluorinated linear polyethers and copolyethers and mixtures thereof, characterized by having chemically reactive functions at both ends of the chain and having the general formula:

$$A-O-(C_3F_6O)_m-(CF_2O)_n-(C_2F_4O)_l-B$$

wherein: $C_3F_6$ and $C_2F_4$ represent perfluoroalkylene units derived from the opening of the double bond, respectively, of a hexafluoropropylene and of a tetrafluoroethylene molecule, the different oxyperfluoroalkylene units having a random distribution along the chain, $m$ is zero or an integer from 1 to 50, the indices $n$ and $l$ are either simultaneously zero or are each an integer varying from 1 to 50; the sum $(m+n+l)$ is a number between 1 and 100, preferably between 1 and 85; A and B are the same or different from each other and are selected from the group consisting of $CF_2$—COOH,

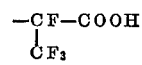

and $CF_2$—CO—$CF_3$, the last two being possible only when $m$ is different from zero, and their corresponding acyl halides, esters, amides, nitriles, salts, ketone hydrates and hemiketals.

The present invention also provides a process for the preparation of the above new products, as well as products in which the three indices $m$, $n$ and $l$ can be simultaneously zero, and mixtures thereof. This process involves cleavage, with reducing agents, of a linear perfluorinated polyether (or copolyether) containing peroxidic oxygen and, optionally, subsequent treatments of the reduction products. More particularly, the process of the present invention comprises the cleavage of a perfluorinated linear polyether, containing peroxidic oxygen bridges, or a mixture thereof, having the general formula:

$$X-O(C_3F_6O)_p-(CF_2O)_q-(C_2F_4O)_r-(O)_s-Y$$

wherein the different oxyperfluoroalkylene units are randomly distributed along the chain; X and Y are the same or different from each other and are selected from the group consisting of

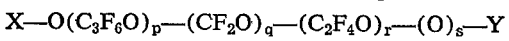
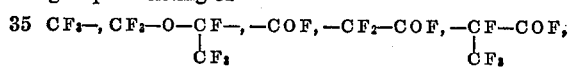

and the derivatives thereof obtained by hydrolysis, salt formation, or esterification of the acid fluoride groups and by addition of water or alcohols to the ketone groups; —(O)— is an oxygen atom distributed at random along the chain and linked in the peroxidic form to the different oxyperfluoroalkylene units; the indices $p$, $q$, and $r$ are whole numbers from 0 to 100 with the limitation that $(p+r)$ is always different from zero and that the sum $(p+q+r)$ has a value between about 10 and 100 or even higher; $s$ is a number from 1 to 90; the ratio $s/(p+q+r)$ is between about 0.01 and 0.9, and preferably between 0.1 and 0.5, and the value of the expression $(p+r)-s$ is always greater than zero, said cleavage being carried out by reacting the above defined polyether or a mixture of such polyethers with a reducing agent at a temperature of from about −30° C. to 250° C., preferably from about 20° C. to 100° C., under pressures between about 1 and 200 atm., preferably between 1 and 100 atm., optionally in the presence of a solvent or of a dispersing agent, said reducing agent being selected from the group consisting of molecular hydrogen, nascent hydrogen, primary and secondary alcohols such as methanol, ethanol, isopropanol, etc., either alone or in the presence of aluminum alcoholates, such as aluminum isopropylate or the like, simple hydrides, e.g. LiH, KH and AlH₃, boron and aluminum complex hydrides such as LiAlH₄ or NaBH₄, sulfur dioxide, hydrogen sulfide and alkali metal salts thereof, hydrazine, hydroxylamine, phosphorous acid, hypophosphorous acid and the alkali metal salts of phosphorous acid and hypophosphorous acid, stannous chloride and hydroiodic acid.

Optionally, the reduction products may be subjected to further treatments of hydrolysis, salt formation, esterification or amidation of the acid groups, dehydration of amides to nitriles, and addition of water or alcohols or amines to the —$CF_2$—CO—$CF_3$ ketone groups, to obtain the desired terminal groups.

DESCRIPTION OF THE PREFERRED EMBODIMENTS

The process of this invention can be conducted both in the absence as well as in the presence of solvent or dispersing liquid media which are inert with respect to the reactants used and to the terminal groups that are formed.

Examples of inert solvents and dispersing agents which may be employed in the process of the present invention are hydrocarbons, desirably containing from about 5 to 20 carbon atoms; chlorinated hydrocarbons, desirably containing from about 1 (e.g. tetrachloromethane) to 5 carbon atoms; chlorofluorinated hydrocarbons, desirably containing from about 1 to 5 carbon atoms; preferably fluorinated and perfluorinated hydrocarbons, desirably containing from about 5 to 20 carbon atoms; linear and cyclic ethers, such as diethyl ether, tetrahydrofurane, dioxane, etc.; perfluorinated ethers, such as perfluoropropylpiran, etc.

The bifunctional polyethers (including copolyethers) A—$O(C_3F_6O)_m$—$(CF_2O)_n$—$(C_2F_4O)_r$—B of the present invention and their mixtures can be separated from other possible reaction products or by-products, such as HF or alkali metal fluoride, in the reaction mixture by conventional methods, e.g., distillation, evaporative distillation, salt formation, filtration, or the like.

The reaction with reducing agents in the process of this invention causes a cleavage of the peroxidic bridges present in the chains of the starting compounds. More particularly, there occurs a cleavage of the oxygen-to-oxygen bond with the consequential cleavage of the chain of the starting polyether at the sites of the peroxidic bridges present in the macromolecule, thus resulting in shorter molecular chains which contain at both ends chemically reactive functions—the products of the present invention.

The reducing agents that cause the above mentioned cleavage belong, more particularly, to the following classes:

1. Molecular hydrogen, which is preferably employed in the presence of catalysts such as palladium, platinum or Raney-nickel, either in finely subdivided form or supported on carbon or on aluminum oxide, in the presence or absence of liquid solvent or dispersing media such as alcohols, ethers, hydrocarbons, and halogenated hydrocarbons, preferably perfluorinated hydrocarbons. The reaction can conveniently be carried out at temperatures between about 0° C. and 200° C., preferably between about 20° C. and 100° C., and under hydrogen pressures between about 1 and 200 atmospheres, preferably between 5 and 100 atmospheres.

2. Nascent hydrogen, that is, hydrogen directly produced in the reaction zone by the action of alkali or alkaline earth metals in aliphatic alcohols or of their amalgams in water or aliphatic alcohols or by the action of electro-positive metals (such as Zn, Al, Sn, Fe) in inorganic acids or inorganic bases. A particularly useful reducing system of this type is, for instance, activated zinc suspended in acetic acid, at temperatures between about 50° C. and 120° C., under substantially atmospheric pressure.

3. Primary or secondary alcohols of the aliphatic series, alone or in the presence of aluminum alcoholates. Alcohols suitable for the purpose include, for instance, methyl alcohol, propyl alcohol and ethyl alcohol. A particularly suitable reducing agent of this class is isopropyl alcohol in the presence of aluminum isopropylate. The reduction of the peroxidic polyether with this class of reducing agents is preferably conducted at temperatures between about 50° and 120° C. and under atmospheric or slightly greater than atmospheric pressure.

4. Simple or complex hydrides, such as, for instance, LiH, $LiBH_4$, $NaBH_4$, $LiAlH_4$, boron hydride and alkylboron hydrides, preferably at reaction temperatures between about 30° C. and 150° C., in the presence of a suspending medium such as ethyl ether, or 1,2-dimethoxyethane, or even water in the case $NaBH_4$.

5. Elements (or derivatives thereof) of Groups IV, V, VI-A and VIII of the Periodic Chart of the Elements published by Fisher Scientific Company, in their lower oxidation state. Examples of such derivatives are: $SO_2$ and $H_2S$ and their alkali metal salts, even in aqueous solution, preferably employed at a reaction temperature between about 30° and 200° C. and under pressures between about 1 and 25 atmospheres; hydrazine and hydroxylamine in anhydrous or aqueous alcoholic medium; phosphorous or hypophosphorous acid or their alkaline salts in aqueous solution; stannous chloride in aqueous solution, also in the presence of hydrochloric acid or ammonium chloride or caustic alkali. Examples of such elements are: iron and tin, desirably in the presence of an acid such as HF, HI, HCl, HBr, $H_2SO_4$, and the like.

6. Hydroiodic acid, including aqueous or organic solutions of the alkali metal salts thereof, in the presence of organic and inorganic acids, at temperatures between about room temperature (22° C.) and 150° C., under atmospheric or slightly greater than atmospheric pressure.

It must be noted that the reduction treatments based on the use of boron and aluminum hydrides, or in which hydrogen is developed in situ by the action of electropositive metals in protogenic solvents, are preferably conducted in such a way as to supply the stoichiometric quantity of reducing agent in ratio to the amount of peroxidic groups to be reduced, so as to prevent possible undesired chemical reductions of the carbonyl functions of the terminal groups of the products.

The polyethers and copolyethers containing peroxidic bonds that are used as starting materials in the process of the present invention may be obtained through already described methods, such as those hereinbefore mentioned, which are based on the reaction, prevailingly activated by a photochemical process, of oxygen with tetrafluoroethylene or with hexafluoropropylene or with a mixture of the two fluoroolefins.

Among these starting materials, those which we have found to be particularly useful in the process of the present invention, include, for instance, the polyperoxidic polyethers of high molecular weight, which are obtained by photochemical reaction at low temperature (i.e. below —30° C.) of oxygen with hexafluoropropylene in liquid phase. They have the following general formula:

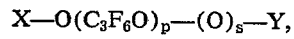
$$X—O(C_3F_6O)_p—(O)_s—Y,$$

or, more precisely,

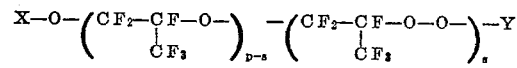

in which the ratio between peroxidic bridges and ether bridges (which are randomly distributed along the chain), that is the ratio $s/(p-s)$, can be varied on the basis of a suitable choice of the parameters of the reaction (i.e.: radiation intensity of UV rays, temperature, degree of conversion, etc.) within the preferred range of from 0.1 to 1.

As is described in U.S. Patent Application Ser. No. 650,257, filed June 30, 1967, by conducting the same reaction at higher temperatures, for instance higher than —30° C., different perfluoroalkylene units, having the structure —$CF_2$—, can be introduced into the above peroxidic polyethers so that the average formula of the products becomes:

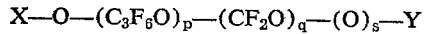
$$X—O—(C_3F_6O)_p—(CF_2O)_q—(O)_s—Y$$

wherein the ratio $q/p$ may vary between about 0.01 and 5.

By analogous photooxidation reactions on mixtures of hexafluoropropylene and tetrafluoroethylene, there may be prepared suitable starting peroxidic copolyethers also containing variable contents of —CF$_2$—CF$_2$— perfluoroalkylene units, that is, copolyethers having the structure:

$$X—O(C_3F_6O)_p—(C_2F_4O)_r—(O)_s—Y \text{ or}$$

$$X—O—(C_3F_6O)_p—(CF_2O)_q—(C_2F_4O)_r—(O)_s—Y$$

wherein the ratio $r/p$ may be, for instance, between about 0.1 and 10 and the ratio of $q/(p+r)$ may be between about 0.01 and 5.

In U.S. Patent Application Ser. No. 702,533, filed Feb. 2, 1968, there have also been described photooxidation reactions of only tetrafluoroethylene dissolved in an inert solvent whereby there are prepared the starting peroxidic copolyethers of the formula:

$$X—O—(CF_2O)_q—(C_2F_4O)_r—(O)_s—Y$$

wherein the ratio of $g/r$ can vary, for instance, within the range of from about 0.2 to 5, the ratio of $s/(q+r)$ can be between about 0.1 and 0.5, still having, however, the difference $r—s$ greater than O, and X and Y can be the CF$_3$—, —COF or —CF$_2$—COF groups.

All of these products are within the foregoing general formula defining the starting materails used in the process of this invention.

In addition, the following products, also within said general formula and having the formula:

$$X—O—(C_2F_4O)_r—(O)_s—Y \text{ or}$$

$$X—O—(CF_2—CF_2—O)_{r-s}—(CF_2—CF_2—O—O—)_s—Y,$$

with X and Y selected from the CF$_3$, —COF and —CF$_2$—COF terminal groups, and having a ratio $s/(r—s)$ between about 0.2 and 5, are prepared through the direct reaction of tetrafluoroethylene with oxygen under more than atmospheric pressure, by such procedures as, for instance, those reported by A. Pajaczowski and J. W. Spoots in Chem. Ind. 1964, p. 659; F. Gozzo & G. Carraro in Nature, *206*, 507 (1965).

The action of the above defined reducing agents on the peroxidic polyethers and copolyethers causes, as was explained before, the cleavage of the —O—O— bonds present in the chains, according to reactions that can, for example, be schematized by the following equations, in which the symbols P and P' represent perfluorinated polyether chains of any arbitrary length and structure within the foregoing definitions of the starting materials.

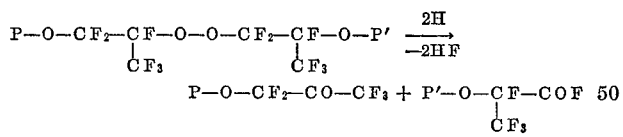

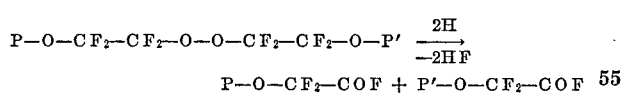

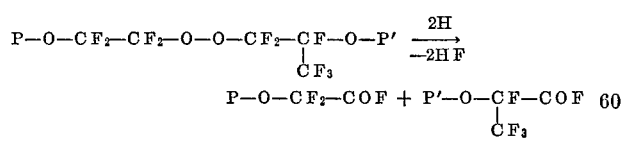

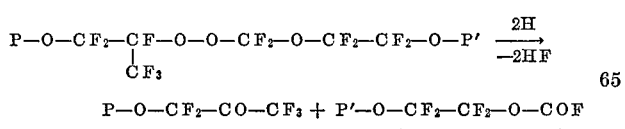

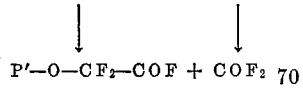

The rupture of the starting macromolecule at the site of each of the peroxide bridges ($s$) causes the formation of a mixture made up of ($s+1$) molecules of perfluorinated polyethers of lower molecular weight than the starting polyether, and containing at least ($s-1$) molecules which at both ends have chemically reactive functions, such as the ketone and carboxylic acid functions. (As shown in the last of the above indicated reactions, chemical functions of the fluoroformate —O—COF type can form following the rupture of a peroxidic bond adjacent to one —CF$_2$—O— unit; in this case, given the known instability of said funtcion, there must be expected either in the reaction medium itself or during the subsequent treatment of the products, the elimination of COF$_2$ and the formation of a new end group with a carboxylic or ketonic function depending on the subsequent perfluoroalkylene unit).

As illustrated below, the rupture of the peroxidic linkages causes the formation of polyether chains with acid fluoride groups at both ends when the starting peroxypolyether macromolecule contains only —CF$_2$—CF$_2$— perfluoroalkylene units whereas there are formed polyether chains containing an acid fluoride group at one end and a ketonic group at the other end when the starting peroxypolyether macromolecule contains only

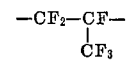

perfluoroalkylene units.

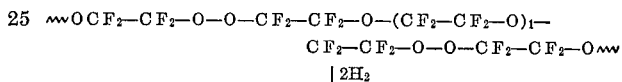

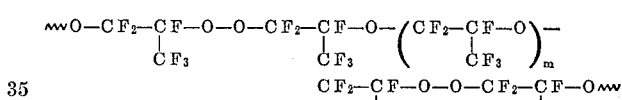

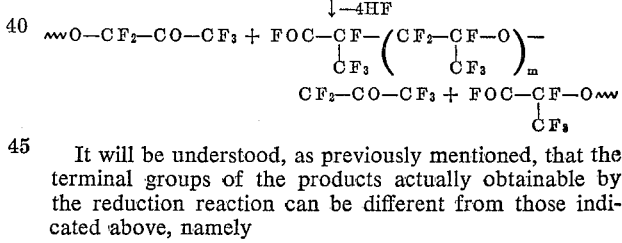

It will be understood, as previously mentioned, that the terminal groups of the products actually obtainable by the reduction reaction can be different from those indicated above, namely $$—CF_2—CO—CF_3, —CF_2—COF \text{ and } —CF—COF.$$
$$\qquad\qquad\qquad\qquad\qquad\qquad\qquad\quad |$$
$$\qquad\qquad\qquad\qquad\qquad\qquad\qquad\quad CF_3$$

That is, they can be the derivatives of these groups obtained by hydrolysis, esterification, hydration and salt formation with various reactants or solvents present in the reaction medium or used in the course of the processing of the products.

The average molecular weight of the perfluorinated polyethers with reactive functions at both ends, thus obtained, depends essentially on the concentration of peroxidic groups of the starting polyether. More precisely, the greater this concentration, the lower the molecular weight of the difunctional polyethers. As an order of magnitude, with reference to the general formulae reported before, the average value of the sum $(m+n+l)$ in the bifunctional polyethers of the present invention, obtained by the process of this invention, is the same as the ratio $$(p+q+r-2s)/(s+1)$$

which characterizes the starting peroxidic materials. The average molecular weight of the bifunctional polyethers can be less than that value when oxydifluoromethylene —CF$_2$—O— units adjacent to peroxidic bridges are present in great numbers in the starting product.

Considering the fact that the distribution of the peroxidic bridges and of the ether bridges in the molecules of the starting materials is of a substantially random nature, it follows that the break up of said peroxidic bridges produces a mixture of bifunctional polyethers having different chain lengths.

For instance, by subjecting to reducing cleavage a mixture of peroxidic polyethers having the structure $$X-O-(C_3F_6O)_p-(O)_s-Y$$

that is $$X-O-\left(\underset{\underset{CF_3}{|}}{CF_2-CF-O}\right)_{z-s}\left(\underset{\underset{CF_3}{|}}{CF_2-CF-O-O}\right)_s-Y$$

there is obtained as the main reaction product (for instance after hydrolysis) a mixture of polyethers with acid and ketone terminal groups having the general formula:

$$HOOC-\underset{\underset{CF_3}{|}}{CF}-O-\left(\underset{\underset{CF_3}{|}}{CF_2-CF-O}\right)_m-CF_2-CO-CF_3$$

In the reaction mixture are present various members of the series characterized by a precise value of the index $m(0, 1, 2, 3, 4,)$, and the average of $m$ characterizing this mixture approximates the ratio $(p-2s)/(s+1)$. In the reaction mixture are also present polyethers having at one end of the chain one of the original end groups (X, Y). The molar concentration of these latter products tends to the value of $2/(s+1)$ and decreases with increasing molecular weight and peroxidic bridge content of the initial polyperoxide-polyether.

In the event that the starting polyether contains more than one type of perfluoroalkylene unit, the bifunctional products obtained by the process of the present invention, in addition to the molecular weight distribution discussed above, will also have a structural or compositional distribution as discussed below.

For instance, the reducing cleavage of a product of the average formula:

$$X-O-(CF_2O)_q-(C_2F_4O)_r-(O)_s-Y,$$

after hydrolysis of the acyl fluoride groups, gives a mixture of bicarboxylic acids of the general formula:

$$HOOC-CF_2-O-(CF_2O)_n-(C_2F_4O)_l-CF_2-COOH$$

having an average degree of polymerization $(n+1)$ the same as or only slightly less than the value of $$(q+r-2s)/(s+1),$$

with an average ratio $n/(l+2)$ the same as or only slightly lower than the ratio $q/r$ of the starting product. The mixture contains bicarboxylic polyethers of different molecular weight or polyethers of the same degree of polymerization, $(n+1)$, but characterized by a different chemical composition, that is, by a different ratio $n/l$, or also polyethers of identical general formula but isomeric amongst themselves, due to a different (random) distribution of the two perfluoroalkylene units along the chain.

For example, by treating, in accordance with the present invention, mixtures of peroxidic copolyethers of the formula: $X-O-(CF_2-O)_q-(C_2F_4O)_r-(O)_s-Y$ characterized by ratios $s/(q+r-s)$ of the order of 0.3, by ratios $r/q$ around 1.5 and by average molecular weights around 10,000 $(q+r \geqslant 100)$ one obtains, after hydroylsis, mixtures in which are present the following bicarboxylic acids:

HOOC—CF$_2$—O—CF$_2$—COOH (3-oxaperfluoroglutaric acid)
HOOC—CF$_2$—O—CF$_2$—O—CF$_2$—COOH (3,5-dioxaperfluoropimelic acid)
HOOC—CF$_2$—O—CF$_2$—CF$_2$—O—CF$_2$—COOH (3,6-dioxaperfluorosuberic acid)
HOOC—CF$_2$—O—CF$_2$—O—CF$_2$—CF$_2$—O—CF$_2$—COOH (3,5,8-trioxaperfluorosebacic acid)
HOOC—CF$_2$—O—(CF$_2$—CF$_2$—O)$_2$—CF$_2$—COOH (2,5,8-trioxaperfluorononan-1,9-dicarboxylic acid)
HOOC—CF$_2$—O—(CF$_2$—O)$_2$—CF$_2$—CF$_2$—O—CF$_2$—COOH (2,4,6,9 - tetraoxaperfluorodecan-1,10-dicarboxylic acid)
HOOC—CF$_2$—O—CF$_2$—O—CF$_2$—CF$_2$—O—CF$_2$—O—CF$_2$—COOH (2,4,7,9-tetraoxaperfluorodecan-1,10-dicarboxylic acid)
HOOC—CF$_2$—O—CF$_2$—O—(CF$_2$—CF$_2$—O)$_2$—CF$_2$—COOH (2,4,7,10-tetraoxaperfluoroundecan-1,11-dicarboxylic acid)
HOOC—CF$_2$—O—CF$_2$—O—(CF$_2$—CF$_2$—O)$_2$—CF$_2$—COOH (2,4,7,10-tetraoxaperfluoroundecan-111-dicarboxylic acid)
HOOC—CF$_2$—O—CF$_2$—CF$_2$—O—CF$_2$—O—CF$_2$—CF$_2$—O—CF$_2$—COOH (2,5,7,10-tetraoxaperfluoroundecan-1,11-dicarboxylic acid)
HOOC—CF$_2$—O—(CF$_2$—CF$_2$—O)$_3$—CF$_2$—COOH (2, 5,8,11-tetraoxaperfluorododecan-1,12-dicarboxylic acid) four isomeric bicarboxylic acids, HOOC—CF$_2$—O—(CF$_2$O)$_2$—(CF$_2$—CF$_2$—O)$_2$—CF$_2$—COOH ("isomeric" referring to the distribution of the two —CF$_2$O— units and the two —CF$_2$—CF$_2$—O— units along the chain);
HOOC—CF$_2$—O—(CF$_2$—CF$_2$—O)$_4$—CF$_2$—COOH (2, 5,8,11,14 - pentaoxaperfluoropentadecan-1,15-dicarboxylic acid) and bicarboxylic acids of similar structure but of greater molecular weight.

The different bifunctional polyethers obtainable by the process herein described can be isolated in the pure state from the mixtures containing them by using conventional techniques, such as for instance: distillation, vapor phase or liquid phase chromatography, selective extraction with solvents, etc., either by operating directly on the reaction product or after suitable treatments for chemically modifying the reactive end groups (i.e.: esterification, salt-formation, amidation of the carboxylic groups, formation of acyl halides, formation of addition compounds of ketone groups with water, alcohols or amines, etc.).

For many of the possible applications it is not necessary, however, to use compounds of this type in the pure state, but it is possible to use them in mixture characterized, for instance, by a more or less limited distribution of molecular weights and of composition.

It must be noted that the described bifunctional polyethers can be further transformed into a great number of derivatives, by recourse to typical reactions of both the carboxylic acid groups and the ketone groups. Among these latter reactions can be mentioned, for instance, the reaction with aqueous bases according to the following scheme:

$$P-O-CF_2-CO-CF_3 \xrightarrow{OH^-} \begin{bmatrix} \to P-O-CF_2H + CF_3COO \\ \to P-O-CF_2-COO^- + CF_3H \end{bmatrix}$$

by which reaction the terminal ketone function is transformed into a neutral and stable group —CF$_2$H or into a carboxylic acid —CF$_2$—COOH group.

The bifunctional polyethers of the present invention with chemically reactive functions at both ends, find a direct use in the synthesis of polycondensation polymers. Such polymers (polyesters, polyamides, polyimides, etc.) have particularly desirable characteristics of heat resistance and stability to solvents, owing to the presence of fluorine in their molecules. For instance, polymers such as the polyamide of Example 14 may be formed into self supporting films that are stable to solvents, light, oxygen, and heat.

Moreover, such polymers exhibit the highly desirable characteristic of flexibility at very low temperatures, e.g., as low as of the order of —100° C., due to the presence of ether bridges in the chain.

In addition, many of the bifunctional polyethers exert an important action on the reduction of the surface tension of aqueous solutions. They can therefore be used as surface active agents, such as for example the acids and ketoacids of Example 1. Other bifunctional polyethers, especially those containing ester groups and nitrile groups, such as for example those of Examples 2 and 3, are valuable plasticizers for fluorinated polymers and, being characterized by a very high thermal stability, can be used as heat transfer agents in a wide range of temperatures.

The bifunctional polyethers, owing to the presence of a chain containing perfluorinated groups and of reactive chemical functions, can be used as starting materials for the synthesis of various derivatives useful for imparting oil- and water-repellency to fibers, films and textiles.

For the convenience of the reader, some spectroscopic data which are useful for the determination of the structure of polyethers, copolyethers and mixture thereof, of the type herein described, are set forth below. These data relate to absorptions in the IR spectrum and to resonance bands in the nuclear magnetic resonance (NMR) spectrum which it is believed can be associated with the presence of given chain terminal groups.

In the infrared (I.R.) absorption spectrum, the following relationships can be considered:

| Terminal groups | Associated I.R. absorption |
|---|---|
| $-CF_2-COF$ | 1.884 cm.$^{-1}$ |
| $-CF-COF$<br>$\quad\|$<br>$\quad CF_3$ | 1.876 cm.$^{-1}$ |
| $-COOH$ | 1.778 cm.$^{-1}$ |
| $-CF_2-CO-CF_3$ | 1.803 cm.$^{-1}$ |
| $-CF_2-C(OH)_2-CF_3$ | 3.612 cm.$^{-1}$ |

In the resonance spectrum of fluorine the resonances in the listed zones have been associated (by us) with fluorine atoms belonging to the corresponding terminal groups listed in the last column.

| P.p.m. (from CFCl$_3$) | Number of fluorine atoms | Terminal group |
|---|---|---|
| $-12.5$ to $-13$ | 1 | $-O-CF_2-COF$ |
| $-26.4$ | 1 | $-O-CF-COF$<br>$\quad\quad\|$<br>$\quad\quad CF_3$ |
| $+75.7$ | 2 | $-CF-O-CF_2-COOH$<br>$\|$<br>$CF_3$ |
| $+79$ | 2 | $-O-CF_2-O-CF_2-COF$ |
| $+80$ | 2 | $-O-CF_2-O-CF_2-COOH$ |
| $+74.8$ | 3 | $-O-CF_2-CO-CF_3$ |
| $+82.8$ | 3 | $-O-CF_2-C(OH)_2-CF_3$ |
| $+99$ | 1 | $-O-CF-O-CF_3$<br>$\quad\quad\|$<br>$\quad\quad CF_3$ |
| $+56$ | 3 | $-O-CF-CF_2-O-CF_3$<br>$\quad\quad\|$<br>$\quad\quad CF_3$ |
| $+58$ | 3 | $-O-CF_2-O-CF_3$ |
| $+55$ | 3 | $-O-CF-O-CF_3$<br>$\quad\quad\|$<br>$\quad\quad CF_3$ |
| $+59$ | 2 | $-CF_2-O-CF_2-COF$ |

As regards NMR bands associated with the presence of given perfluoroalkylenoxy units in the chains, reference may be had to application Ser. No. 650,257, filed June 30, 1967 and Ser. No. 718,223, filed Apr. 2, 1968.

Set forth below are several examples illustrating the synthesis of typical starting polyethers for use in process of the present invention.

(A) Preparation of a mixture of polyperoxidic perfluoropolyethers having the formula:

$$X-O-(C_3F_6O)_p(O)_s-Y$$

The equipment consisted of a cylindrical reactor of Pyrex glass having a diameter of 80 mm. and a capacity of 1 liter, fitted with 4 necks and provided with a thermometer, an inlet tube for the introduction of gas, a reflux condenser cooled at $-80°$ C., and a Pyrex finger with an outside diameter of 45 mm. immersed coaxially in the reactor and containing an ultra-violet quartz lamp, original Hanau Q 81.

Into this reactor, thermostatically maintained at a temperature of $-45°$ C. and containing 750 g. of $C_3F_6$ in liquid phase, was continuously bubbled through an inlet tube reaching the bottom a gaseous mixture mainly consisting of $O_2$ and recycled olefin, while the gaseous mixture coming out from the system through the top of the reflux condenser, cooled at $-80°$ C., after washing in 40% aqueous KOH and after drying on $CaCl_2$, was reintegrated with new dry $O_2$ corresponding to the amount reacted, and then cycled back into the reactor at a flow rate of about 40 liters/hour.

After 6 hours of reaction at $-45°$ C.$\pm 2°$ C., with a total consumption of 8 liters of $O_2$ measured at ambient conditions, the gaseous products ($C_3F_6$, hexafluoropropylene oxide, $COF_2$, $CF_3-COF$) were vented off and there were obtained 75 g. of a viscous perfluoropolyether oil having a composition corresponding to the average formula $C_3F_{5.97}O_{1.24}$ with a structure (determined by N.M.R. analysis and iodometric titration of active oxygen) conforming to the general formula set forth above, wherein X and Y are.

$$-COF, -CF_3, -CF-OCF_3,$$
$$\quad\quad\quad\quad\quad\quad |$$
$$\quad\quad\quad\quad\quad\quad CF_3$$

and $-CF_2COF$ groups, the relative proportions being about 0.8:1:0.05:0.25, respectively, and in which the average ratio of the indexes $s/p$ is 0.19. By measurement of the number average molecular weight, it was determined that the value of $p$ was between 40 and 45.

(B) Preparation of a mixture of polyperoxidic perfluoropolyethers having the formula:

$$X-O-(C_3F_6O)_p(C_2F_4O)_r-(O)_s-Y.$$

The equipment was exactly the same as that described in Example A except that the finger coaxial to the reactor and holding the U.V.-lamp, Original Hanau Q 81, was made of quartz and had an outside diameter of 25 mm.

Into the reactor, thermostatically maintained at $-40°$ C. and containing 750 g. of $C_3F_6$ in the liquid phase, was continuously bubbled through, with a flow rate of 60 liters/hour, a mixture of $C_2F_4$ and $O_2$ in a molar ratio of 2:1, while the gaseous mixture coming out from the system, after passing through a reflux condenser cooled at $-80°$ C., was allowed to disperse.

After 4 hours of reaction, the gases ($C_3F_6$, $C_2F_4$, epoxides of $C_3F_6$ and of $C_2F_4$, $COF_2$, $CF_3COF$) were vented off. 290 g. of viscous oil were recovered, this oil having a composition corresponding to the average formula $CF_2O_{0.447}$ and having a structure conforming to the general formula set forth above in which X and Y are $$-COF, -CF_3, -CF-OCF_3,$$
$$\quad\quad\quad\quad\quad\quad |$$
$$\quad\quad\quad\quad\quad\quad CF_3$$

and $-CF_2COF$ groups in the relative proportion of 0.7:1:0.01:0.3, respectively, and wherein the average ratio of the indexes $r/p$ is 1.5, $s/(p+r)$ is 0.09. The average value of $(p+r)$ was of the order of 40, as determined by measurement of number average molecular weight.

(C) Preparation of a mixture of polyperoxidic perfluoropolyethers having the formula:

$$X-O-(C_3F_6O)_p-(CF_2O)_q-(O)_s-Y.$$

The equipment used for the purpose was identical to that described in Example (B), except that the reactor was built of steel.

Into the reactor, thermostatically maintained at $0°$ C. and containing 1.06 kg. of $C_3F_6$ in the liquid phase under 5 atmospheres pressure, there was continuously introduced through an inlet tube reaching the bottom a flow of compressed dry $O_2$, while at the outlet of the condenser, kept at $-80°$ C., there were regularly vented through a pin-valve 40 liters/hour of gases substantially consisting of oxygen, while maintaining the pressure inside the system constantly at 5 atmospheres.

After 2 hours of reaction, the gases were evaporated and 280 g of a viscous oil were recovered; having the general formula set forth above, wherein X and Y are

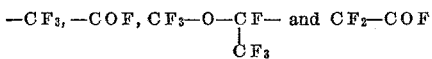

groups, in the relative proportion of 1:0.6:0.2:0.6, respectively, and having a composition corresponding to the elemental formula $CF_{1.99}O_{0.432}$ with a peroxidic oxygen content of 1.65 g. per 100 g. of oil, an average ratio $q/p$ of 0.3 and an average value $(p+q)$ of the order of 12.

(D) Preparation of a mixture of polyperoxidic perfluoropolyethers of the following formula:

$$X—O—(C_2F_4O)_r—(CF_2O)_q—(O)_s—Y.$$

The apparatus was identical to that employed in Experiment (B).

Into the reactor, thermostatically maintained at $-40°$ C. and containing 600 cc. of liquid $CF_2Cl_2$, these were continuously bubbled through an inlet tube reaching the bottom a mixture of dry $O_2$ (flow rate 30 liters/hour) and $C_2F_4$ (at a flow rate of 15 liters/hour, while the gases flowing out of the system, after passing through the reflux condenser kept at $-80°$ C., were allowed to disperse. At the same time, there was continuously drawn from the reactor a solution of polyperoxidic oil dissolved in the $CF_2Cl_2$ solvent which latter was then evaporated and recycled. Under these conditions a production of about 30 g/h of polyperoxidic perfluoroetheric oil was obtained, which oil was highly viscous and had an average molecular weight of about 10,000 and a structure in agreement with the general formula set forth above, wherein X and Y are —$CF_3$, —COF and —$CF_2$COF groups and wherein the average ratio $q/r$ is 0.3 and the ratio $s/(q+r)$ is 0.25.

(E) Preparation of a mixture of polyperoxidic perfluoropolyethers of the formula:

$$X—O—(C_2F_4O_x—(O)_s—Y.$$

Into an autoclave of stainless steel, having a capacity of 200 cc., provided with a pin-value, containing 100 g. of $CF_2ClCFCl_2$ and kept at $-80°$ C., were introduced by distillation, under vacuum, 20 g. of $C_2F_4$. Then 5 liters of dry $O_2$ containing 0.1% of ozone were absorbed into this mass. The resulting mixture was then reacted, while allowing the temperature to rise from $-80°$ C. to $0°$ C. in 15 hours.

At the end of the reaction, after removal of the dissolved gases, there was obtained a solution containing 10.5 g. of a peroxidic product having a structure in agreement with the above general formula, wherein X and Y are —$CF_3$, —COF and —$CF_2$COF groups, and with an average ratio $s/(r-s)$ of 1.5.

(F) Preparation of a mixture of peroxidic perfluoropolyethers having the structure:

$$X—O—(C_2F_4O)_r—(CF_2O)_q—(O)_s—Y.$$

A 5.3 liter stainless steel reactor having a cooling jacket and an inner diameter of 12 cm. and being fitted with inlet pipes reaching the bottom of the reactor for feeding the reacting gaseous mixture and the solvent, and the outlet pipes for the continuous drawing off of the liquid reaction mixture was used. A quartz sheath with an outside diameter of 5 cm., in which was inserted a mercury-vapor lamp of 900 W of the Hanau TQ 1200 type, was placed at the center of the reactor. The gases leaving the reactor were cooled in a reflux condenser at $-78°$ C. The reactor was filled at $-35°$ C. with liquid $CF_2Cl_2$ and a gaseous mixture of 150 l./hr. of $C_2F_4$ and 250 l./hr. of oxygen was continuously fed into the reactor. The reaction mixture was irradiated for 3 hours at $-35°$ C. Thereafter, the reaction mixture was continually drawn off and the $CF_2Cl_2$ solvent therein was removed by evaporation at 80° C. and recycled back to the reactor. The draw off ratio was about 250 g./hr. of recovered reaction product (without solvent) in the form of a viscous and non-volatile liquid.

The reaction was continued until 20 kg. of product was obtained. During this period the gases leaving the reflux condenser, consisting primarily of $COF_2$, tetrafluoroethylene epoxide, unconverted tetrafluoroethylene, unconverted oxygen and $CF_2Cl_2$, were eliminated by washing with a 15% KOH solution. Iodometric analysis of the product showed 2.1 g./100 of peroxidic oxygen. The N.M.R. spectrum showed that the product consisting of —$CF_2$— units and —$CF_2CF_2$— units distributed randomly and linked to each other by ether bridges or by peroxidic groups.

The $C_2F_4/CF_2$ ratio was about 0.8. However, because of high molecular weight, N.M.R. analysis could not detect the presence or the structure of the end groups (perfluoroalkyl, acyl fluorides, fluoroformyl groups). The structure of the product, except for the nature of the end groups X and Y, can thus be indicated by the formula: $X—O—(C_2F_4O)_r—(CF_2O)_q—(O)_s—Y$, wherein the value of the sum $r+q$ is considerably greater than 100; $r/q$ is about 0.8 and $s/(r+q)$ is 0.116.

(G) Preparation of a mixture of peroxidic perfluoropolyethers having the structure:

$$X—O—(C_2F_4O)_r—(CF_2O)_q—(O)_s—Y$$

Example F was repeated except that the reactor was filled with liquid $CF_2Cl_2$ at $-50°$ C. and that the reaction mixture consisting of a continuously fed gaseous mixture of 150 l./h. of $C_2F_4$ and 300 l./h. of oxygen was irradiated for 68 hours at a temperature between $-50°$ C. and $-55°$ C. At the end, after the removal by evaporation at 80° C. of the gases and of the $CF_2Cl_2$ solvent therein, 7.5 kg. of residual product were obtained.

The N.M.R. spectrum showed that the product consisted of the —$CF_2CF_2$— and —$CF_2$— units distributed randomly and linked to each other by ether bridges or peroxidic groups, while, because of the high molecular weight, the N.M.R. method could not detect the presence or the structure of end groups. The —$C_2F_4$—/—$CF_2$— ratio was about 1.6, while the peroxidic oxygen content determined by iodometric titration was 2.4 g. of active oxygen per 100 g. of oil.

The structure of the product, except for the nature of the end groups X and Y, can thus be indicated by the general formula:

$$X—O—(C_2F_4O)_r—(CF_2O)_q—(O)_s—Y$$

wherein X and Y are chain end groups, the sum $(r+q)$ is considerably greater than 100, the ratio $r/q$ is about 1.6, and the ratio $s/(r+q)$ is about 0.15.

EXAMPLE 1

Reduction by hydrogen of a mixture of polyperoxidic perfluoropolyethers having the general formula:

$$X—O—(C_3F_6O)_p—(O)_s—Y.$$

Into a stainless steel 1 liter autoclave, fitted with a heating mantle, and containing 20 g. of carbon with 0.5% of palladium supported on it, were introduced 470 g. of the product of Example (A). The autoclave was then evacuated and thereafter hydrogen was introduced until a pressure of 40 atm. was achieved, at room temperature. The mixture was allowed to react for 20 hours at 50° C.

At the end of the reaction, the gas, consisting of $H_2$, $COF_2$ and $CF_3$—COF, was discharged and the reaction product (400 g.) was separated by filtration from the catalytic residue. The thus obtained crude product of the reduction reaction did not contain peroxidic oxygen and had a viscosity at 20° C. about 30 times lower than that of the starting product. N.M.R. (nuclear magnetic resonance) analysis of this product revealed the presence of

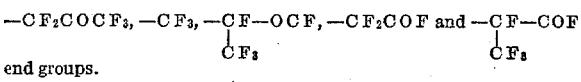

end groups.

350 g. of the reduced product were then hydrolyzed with 500 cc. of 40% (aqueous) $H_2SO_4$ under agitation for two hours in a 1 liter glass flask thermostatically maintained at 50° C.

The organic layer was then separated and stirred for 3 hours, at 50° C., with 40 g. of powdery $CaCO_3$, in order to form the calcium salts of the carboxylic groups. The semi-liquid mixture thus obtained was subjected to distillation by heating to 120° C. while applying a vacuum, gradually decreasing the pressure from 20 mm. Hg to 0.1 mm. Hg.

During this operation there were distilled out about 70 g. of polyether products which were free of carboxylic acid groups.

The saline residue of the distillation was then extracted three times with 500 cc. of a mixture of $CF_2Cl$—$CFCl_2$ and $CH_2Cl_2$ in a volumetric ratio of 4:1, and then slowly added to 500 cc. of 30% HCl in order to free the carboxylic acids. The organic phase thus freed was dried with 98% $H_2SO_4$ and then with $Na_2SO_4$. Various analyses (N.M.R. spectroscopy, acidimetric titration) showed that the product obtained is a mixture of bifunctional polyethers predominantly comprising the products of the series:

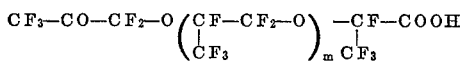

with an average value of m between 3 and 4.

By fractional distillation of this mixture there was separated the lower perfluorinated ketoacids, having the boiling temperatures recorded in Table 1, in the indicated amounts.

During this distillation there were also separated minor amounts of the following bicarboxylic acids:

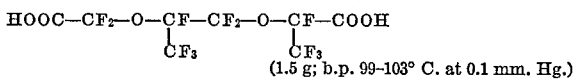

(1.5 g; b.p. 99–103° C. at 0.1 mm. Hg.)

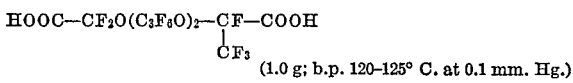

(1.0 g; b.p. 120–125° C. at 0.1 mm. Hg.)

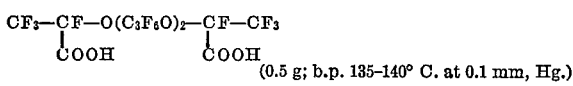

(0.5 g; b.p. 135–140° C. at 0.1 mm. Hg.)

TABLE 1

| $CF_3COCF_2O(C_3F_6O)_m$-CF-COOH<br>                                                  $CF_3$ | | |
|---|---|---|
| m | Amount (g.) | Boiling temperature (° C.) |
| 1 | 10 | 188–190° C. |
| 2 | 9 | 210–212° C. |
| 3 | 5.5 | 95–98/0.2 mm. Hg. |
| 4 | 5 | 100–103/0.1 mm. Hg. |

The residue (80 g.) had an average acidimetric equivalent weight of about 1700 and, by N.M.R. analysis, was found to consist of a mixture of bifunctional polyethers of the same constitution but greater molecular weight. Samples of the isolated keto-acids and bicarboxylic acids and of mixtures thereof, as well as of the residual mixture, were found to have the property of lowering the surface tension of water from 72 dyne/cm. at 20° C. down to 15–20 dyne/cm. at 20° C., even in concentrations of 0.01%.

EXAMPLE 2

The polyperoxidic polyether oil of Example 1 was subjected to reduction by reacting it with an excess of methyl alcohol at the reflux temperature of the alcohol. A sample of 200 g. of said oil was reacted with 200 g. of 99.9% methanol at reflux temperature, for 30 hours. Thereafter the mixture was poured into a mixture of water and ice (500 g.) and the organic layer was then separated and brought to a constant weight by evaporation of the residual alcohol at a temperature of 30° C. and under a vacuum of 20 mm. Hg. The mixture was then treated with 98% $H_2SO_4$ at a temperature of 0° C. 150 g. of the residual product thus obtained were subjected to fractional distillation, whereby the following pure compounds were obtained in the amount indicated:

| | m | Amount (g.) | Boiling point (° C.) |
|---|---|---|---|
| $CF_3$—CO—$CF_2$—O—$(C_3F_6O)_m$—CF—COOCH$_3$<br>                                            $CF_3$ | 1<br>2<br>3<br>4 | 2<br>2.5<br>2.8<br>2.5 | 155–156<br>189–191<br>225–227<br>258–260 |
| $CF_3$—CF—O—$(C_3F_6O)_m$—CF—COOCH$_3$<br>     COOCH$_3$                  $CF_3$ | 1<br>2 | 0.5<br>0.8 | 210–212<br>237–239 |

EXAMPLE 3

A sample of 50 g. of the same polyperoxidic polyether used as the starting material in Example 2 was introduced into a 300 cc. glass flask, fitted with a stirrer and a reflux condenser, together with 45 cc. of glacial $CH_3COOH$ and 4.5 g. of powdered activated Zn. The resulting reaction mixture was stirred for 15 hours at reflux temperature. Then the acetic acid was extracted with water saturated with NaCl, the unreacted excess Zn was then dissolved by adding 25 cc. of 20% $H_2SO_4$, the aqueous layer was then again separated and the organic layer was diluted with 50 cc. of $CF_2ClCFCl_2$ and then dried with 98% $H_2SO_4$. The solvent was then evaporated and the residue brought to constant weight under a 1 mm. Hg vacuum at 30° C. Thereby 30 g. of a product free of peroxidic oxygen were obtained. The reduction product had an equivalent average acidimetric weight (PE) of about 1400, as determined by the formula $$PE = \frac{W \times 100}{M}$$

wherein W is the weight expressed in grams of the sample, and M represents the numbers of milliters of 0.1 N solution of NaOH employed for neutralization of the acid groups contained in the sample.

By treating this product with excess $SOCl_2$ at reflux temperature for 3 hours, then removing the excess reactant by mechanical separation and subsequent extraction with benzene, and finally treating the product with methanol in the presence of anhydrous pyridine, a mixture of esters of the carboxylic acids was obtained. This mixture was separated by rectification into various fractions in which, by gas-chromatography, there were identified the same products identified and described as esters in Example 2.

EXAMPLE 4

A sample of 30 g. of the polyperoxidic polyether oil described and used as the starting material in Example 1 was dissolved in 100 cc. of anhydrous ethyl ether, and placed in a 500 cc. glass flask fitted with a stirrer, a reflux condenser and a dropping funnel. To the solution of the oil, kept under agitation and thermostatically maintained at −10° C., was slowly added, within a period of 1 hour, a solution consisting of 0.4 g. of $LiAlH_4$ in 100 cc. of anhydrous ethyl ether.

At the end of this operation, 1 cc. of methanol was slowly added within a period of 10 minutes, and the resulting mixture was then poured into 40% $H_2SO_4$ at a temperature of 0° C.

The organic layer was separated and filtered over $Na_2SO_4$. Upon iodometric analysis, it did not appear to contain peroxidic oxygen and showed an equivalent acidimetric average weight of about 1380. The gas chromatographic and N.M.R. analysis after esterification and fractional distillation of this product confirmed that the structures of the reduction products were the same as for those described in the preceding examples.

EXAMPLE 5

The reduction carried out in Example 4 was repeated under the same conditions, using as the dispersing agent isopropyl alcohol and as the reducing agent equivalent amounts of $NaBH_4$. Thereby were obtained similar results to those obtained in Example 4.

EXAMPLE 6

20 g. of peroxidic perfluoropolyether oil, of the same composition as that used in Example 1, were introduced into a 50 cc. stainless steel autoclave together with 5 cc. of $H_2O$. To this were then added 10 g. of $SO_2$, and the whole mixture was then reacted under agitation for 30 hours at 100° C. At the end of the reaction, after removal of the gases, the product (15 g.), dried over 98% $H_2SO_4$ and filtered over $Na_2SO_4$, showed practically no peroxide content and appeared to be formed by a mixture of polyethers prevailingly corresponding to the general formula:

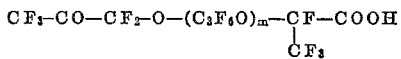

with an average value of $m$ between 3 and 4.

EXAMPLE 7

A sample of 20 g. of the peroxidic perfluoropolyether oil described as the starting material in Example 1 was reacted with 1 cc. of hydrazine in the presence of 15 cc. of ethyl ether in a glass flask, at the reflux temperature of the solvent, for 20 hours. At the end of the reaction, the mixture was poured into 20% $H_2SO_4$ under steady stirring, and after 5 hours the separated organic layer, after drying over 98% $H_2SO_4$ and filtering over $Na_2SO_4$, and after evaporation of the solvent, showed no peroxidic oxygen and the same composition as that found in the previous examples.

EXAMPLE 8

A sample of 50 g. of peroxidic perfluoropolyether oil, having the same characteristics as the starting material used in Example 1, was poured into a 500 cc. glass flask together with 12 g. of $Al(Oi-C_3H_7)_3$ (triisopropoxy aluminum) and 200 cc. of isopropyl alcohol, and the mixture was then reacted for 20 hours at reflux temperature. At the end of the reaction, the mixture was poured into an excess of 20% $H_2SO_4$ at a temperature of 0° C., and the perfluorinated organic product was fractionated by following the procedures described in the previous examples.

This product had an equivalent average acidimetric weight of about 1420, did not show any peroxidic oxygen by iodometric analysis, was and, according to the N.M.R. analysis, formed of a mixture of the products already described in the preceding examples.

EXAMPLE 9

Reduction by means of hydroiodic acid of a mixture of polyperoxidic perfluoropolyethers of the general formula:

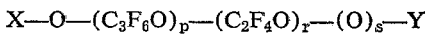

40 g. of an oil prepared as described in Example (B) were dissolved in 100 cc. of $CF_2Cl-CFCl_2$ and were then introduced dropwise into a 500 cc. flask equipped with a stirrer and a reflux condenser, containing a mixture consisting of 100 cc. of acetic anhydride, 100 cc. of

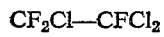

and 10 g. of NaI.

This mixture was then reacted for 3 hours, and then was diluted with 100 cc. of 10% HCl, and the iodine thus formed was reduced with a stream of $SO_2$. The resulting mixture was poured into a mixture of water and ice (500 g.) and the organic layer was then washed with water saturated with $SO_2$ and thereafter dried over 98% $H_2SO_4$ and then over $Na_2SO_4$.

After evaporation of the solvent, the product appeared to be free of peroxidic oxygen and showed an equivalent average acidimetric weight of 1330. The N.M.R. analysis revealed that the prevailing terminal groups were

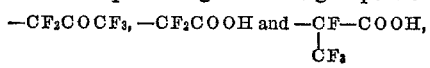

with minor amounts of $-CF_3$ groups.

The reduced product was then treated with 5 g. of $CaCO_3$ in order to form the calcium salts of the carboxylic acid groups and the mixture was then subjected to distillation under vacuum at 150° C. and at a pressure of 0.1 mm. Hg. The residue, after repeated washing with a mixture of $CF_2Cl-CFCl_2$ and $CH_2Cl_2$ in a volume ratio of 4:1, was poured into 50 cc. of 30% HCl in order to free the carboxylic acids from their calcium salts.

Thereupon the organic layer was separated and dried with 98% $H_2SO_4$, thereby obtaining 25 g. of a mixture of bicarboxylic acids and ketoacids with an average formula:

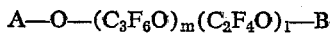

wherein A and B were

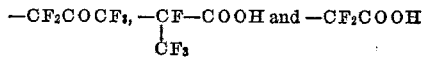

groups, the ratio $m/l$ was about 0.6 and the average value $(m+l)$ was between about 6 and 7.

EXAMPLE 10

Reduction by hydrogen of a mixture of polyperoxidic perfluoropolyethers of the general formula:

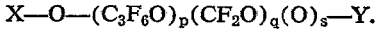

A sample of 100 g. of an oil, obtained according to the procedure of Example (C), was introduced into a 200 cc. stainless steel autoclave which contained 5 g. of carbon containing 0.5% of palladium, and then 50 atm. of hydrogen were introduced and the mixture reacted for 15 hours under agitation at 50° C.

After having discharged the gases, the reaction products were poured into 200 cc. of 40% sulfuric acid in order to hydrolize the acid fluorides. Then the organic layer was treated with 15 g. of $CaCO_3$, and subjected to distillation at from 150 to 170° C. under a vacuum which was gradually intensified to 0.1 mm. Hg. The saline residue was then washed thrice with 100 cc. of a mixture of

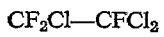

and $CH_2Cl_2$ (4:1 volume ratio), and then acidified with 30% HCl. The organic layer was then separated and dried with 98% sulfuric acid and then with $Na_2SO_4$. The product thus obtained (40 g.), by N.M.R. analysis and acidimetric titration, was found to consist of a mixture of polyethers containing at least one carboxylic acid terminal group and corresponding to the general formula:

wherein A and B are selected from

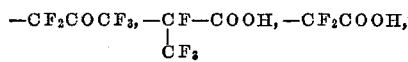

and minor amounts of $-CF_3$ terminal groups, and the average ratio $n/m$ is about 0.2, while the sum $(m+n)$ is about 3.

From this mixture were separated, by fractional distillation and by gas-chromatography of the esterified fractions, among others, the following new bifunctional polyethers:

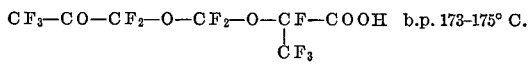 b.p. 173-175° C.

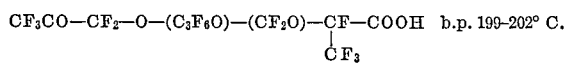 b.p. 199-202° C.

and the methyl ester,

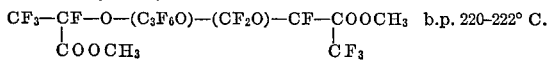 b.p. 220-222° C.

EXAMPLE 11

Reduction by hydrogen of a mixture of polyperoxidic perfluoropolyethers having the general formula:

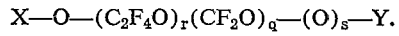

A sample of 200 g. of a product obtained as described in Example (D) was introduced into a 500 cc. stainless steel autoclave containing 10 g. of carbon with 0.5% of palladium, and was thereupon reacted with hydrogen for 20 hours under agitation at a temperature of 40° C. and under a pressure of 40 atm.

A portion of the reduction product, which contained no periodic oxygen, after hydrolysis with 40% sulfuric acid, and drying over 98% $H_2SO_4$ and $P_2O_5$, was found to have an equivalent acidimetric average weight and an N.M.R. analysis in agreement with the average formula:

$$HOOC-CF_2-O(C_2F_4O)_{3.36}(CF_2O)_{2.16}CF_2COOH.$$

This mixture, in a concentration of $5 \times 10^{-5}$ moles/liter, lowered the surface tension of water from 72 dyne/cm. down to 18 dyne/cm.

A portion of 150 g. of the non-peroxidic reduction product, having with acid fluoride terminal groups, was reacted with a small excess of anhydrous $CH_3OH$ and, after removal of the excess of $CH_3OH$ and $HF$, a current of gaseous diazomethane was bubbled therethrough. The esterified mixture thus obtained was fractionated, thus distilling 60% of the product into fractions until reaching 150° C./0.1 mm. Hg. From some of the fractions, by gas-chromatographic separation, the following methyl esters were separated:

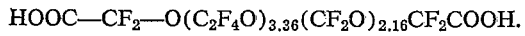

| R | Amount (g.) | Boiling point (° C.) | Remarks |
|---|---|---|---|
| —CF₂— | 0.4 | 198-199 | |
| —CF₂—CF₂— | 2 | 203-204 | |
| —CF₂—O—CF₂— | 0.8 | 205-206 | |
| —CF₂O—CF₂—CF₂— | 1.5 | 213-214 | |
| —CF₂CF₂OCF₂CF₂— | 1.5 | 217 | |
| —(CF₂O)₂CF₂CF₂— | 1.1 | 222-223 | 2 isomers. |
| —CF₂OCF₂CF₂OCF₂CF₂— | 2 | 226-227 | Do. |
| —(CF₂CF₂O)₂CF₂CF₂— | 0.6 | 230 | |
| —(CF₂O)₂CF₂CF₂OCF₂CF₂— | 3 | 234-236 | 4 isomers. |
| —(CF₂CF₂O)₃CF₂CF₂— | 1 | 243-244 | |

Another sample of 5 g. of a mixture of acids of the same average formula:

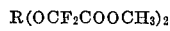

was treated with $SOCl_2$ for 3 hours in a reflux condenser, at the end of which treatment the excess $SOCl_2$ was extracted with benzene and pentane; the end product was found to have undergone a quantitative conversion of the carboxylic groups into acyl chloride groups.

EXAMPLE 12

A sample of 30 g. of a polyperoxidic perfluoroether oil, of the same constitution and chemical characteristics as those of the starting material employed in Example 11, was dissolved in 150 cc. of $CF_2Cl-CFCl_2$ in a three-necked glass 500 cc. flask, fitted with a reflux condenser, stirrer and a dropping funnel.

To this were then added 30 cc. of 95% methanol. The mixture was stirred while slowly adding 30 cc. of 57% hydroiodic acid and was then refluxed for 30 minutes. Then the organic layer was separated from the inorganic phase and the organic layer was washed twice with 20 cc. of 5% aqueous KI solution. Thereupon the organic layer was dried with $P_2O_5$ and the product (20 g.) was distilled under a vacuum of 0.1 mm. Hg at 150° C.

By gas-chromatography analysis, N.M.R. spectroscopy, and the determination of the saponification number of the methyl esters, the reduction product was found to contain, in the form of methyl esters, the bicarboxylic acids, recovered, recognized and described in Example 11.

EXAMPLE 13

Reduction by means of hydroiodic acid of a mixture of polyperoxidic perfluoropolyethers having the following structure:

A sample of 15 g. of an oil obtained by the procedure described in Example (E), dissolved in 25 cc. of

was introduced dropwise into a 250 cc. flask fitted with a stirrer and a reflux-condenser and containing 100 cc. of acetic anhydride, 100 cc. of $CF_2ClCFCl_2$ and 20 g. of NaI.

The resulting mixture was reacted at 20° C. for 3 hours and then diluted with 50 cc. of 20% HCl. The iodine formed was then reduced with a current of $SO_2$. Thereupon the mixture was poured into a mixture of water and ice (500 g.) and the organic layer was separated, washed with a saturated aqueous solution of $SO_2$, and then dried with 98% $H_2SO_4$ and then with $Na_2SO_4$.

5 g. of this product were then esterified with diazomethane. The portion of the product which distilled over at 150° C. under a pressure of 0.1 mm. Hg (80%) was passed through a gas-chromatographic column whereby it was possible to isolate sufficient amounts for identification of the following products:

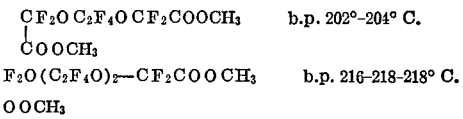

b.p. 202°-204° C.

b.p. 216-218-218° C.

In aqueous solution, 0.020 g./liter of the acid,

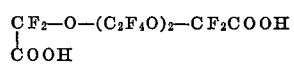

was found to reduce the surface tension of water from 72 dyne/cm. down to 16 dyne/cm. at 20° C.

EXAMPLE 14

5 g. of the ketoacid,

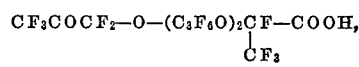

were treated in a small 50 cc. flask, fitted with a reflux condenser connected with a gas buret and a dropping funnel, with 10 ml. of 20% NaOH at a temperature of 50° C. for a period of 2 hours, during which 85 cc. of $CF_3H$ gas, measured under ambient conditions, developed.

The reaction product thus obtained was then acidified with 20 ml. of 35% HCl, whereby a heavy organic liquid separated, which liquid was collected, washed with $H_2O$, dried with 98% sulfuric acid and then fractionated in a microdistiller. At 60° to 65° C. and under a pressure of 1 mm. Hg there were collected about 2 g. of a fraction substantially consisting of the compound

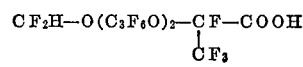

and then, at a temperature of 120°–125° C. and under a vacuum of 0.1 mm. Hg, there were collected 1.5 g. of the bicarboxylic acid $$\begin{array}{c} CF_2-O(C_3F_6O)_2-CF-COOH \\ | \qquad\qquad\qquad\qquad | \\ COOH \qquad\qquad\qquad CF_3 \end{array}$$

with a purity above 97%, as determined by gas-chromatography of the corresponding methyl ester.

1.2 g. of this bicarboxylic acid were then treated with 3 ml. of $SOCl_2$ and with a drop of anhydrous pyridine and then maintained at 60° to 70° C. for 2 hours, letting the $SO_2$ gas and HCl fully develop. At the end of this treatment 1 g. of the product $$\begin{array}{c} CF_2-O(C_3F_6O)_2-CF-COCl \\ | \qquad\qquad\qquad\qquad | \\ COCl \qquad\qquad\qquad CF_3 \end{array}$$

was distilled over.

This product was then dissolved in 6 ml. of $CH_2Cl_2$ and 4 ml. of $CF_2Cl-CFCl_2$ and the solution was then introduced into a 100 cc. test tube. Over this liquid phase was carefully placed a solution of 0.190 g. of hexamethylenediamine dissolved in 32 ml. of 0.1 N NaOH.

On the surface of the two phases a solid white film formed which was grasped by tweezer and removed to thereby promote the formation of more solid product. In this way there were obtained about 0.9 g. of a polyamide having the formula:

$$\left[ -HN-(CH_2)_6-NH-CO-CF_2-O-(C_3F_6O)_2-CF-CO- \atop \qquad\qquad\qquad\qquad\qquad\qquad\qquad\qquad\qquad | \atop CF_3 \right]_n$$

A 0.12% solution of the product in benzotrifluoride had an intrinsic viscosity at 80° C. of 0.35/100 cc./g., thus showing a value of $n$ above 20.

This polymer had a high thermal stability and resistance to oxidation and was practically insoluble in most of the common organic solvents. A fiber of this polymer was recovered unchanged after 10 hours heating in air at a temperature of 250° C.

EXAMPLE 15

Into a stainless steel, 2500 cc. autoclave, fitted with a thermometer, a pressure gauge, a stirrer, a temperature control jacket and inlet valves for liquids and gases, after flushing with nitrogen, were introduced 1500 ml. of twice distilled water containing dissolved therein 0.75 g. of an acid of the formula $$\begin{array}{c} HOOC-CF_2-O(C_3F_6O)_2CF-COOH \\ | \\ CF_3 \end{array}$$

and 0.050 g. of potassium persulfate.

The autoclave was then pressurized by introducing, by means of a compressor, $C_2F_4$ until a pressure of 20 atm. was reached, and the temperature was then adjusted to a temperature of 25° C., which temperature was maintained by the control jacket. By means of a liquid feeding pump there were then introduced into the autoclave 0.050 g. of $Fe(NH_4)_2(SO_4)_2 \cdot 6H_2O$ dissolved in 100 ml. of twice distilled, deaerated water.

As the reaction gradually proceeded, additional $C_2F_4$ was introduced into the autoclave so as to maintain the pressure constant at 20 atm.

After 60 minutes of reaction, the residual gases in the autoclave were discharged into the atmosphere, the autoclave was then opened and an aqueous emulsion of polytetrafluoroethylene was extracted therefrom. This emulsion was coagulated by stirring for 10 minutes with a propeller turning at 700 r.p.m. The coagulated polymer was washed with 5 liters of distilled water, separated, and dried at 120° C. for 24 hours. It weighed 425 g.

From the polymer thus obtained, by preforming and sintering according to the procedure of ASTM D 1457–62T, there were obtained small discs of sintered polymer.

The test samples obtained from these small discs, upon being subjected to a tensile stress at 23° C., has the following characteristics:

Tensile strength: _____ kg./cm.$^2$__ 240
Elongation at break _____ percent__ 280

The above described sintered polymer was of a white color and was homogeneous in appearance. This example demonstrates a useful application of the bicarboxylic acids of the present invention, namely by applying their emulsifying powers in the techniques for the emulsion polymerization of fluoroolefins. Similar results have been obtained in emulsion polymerization tests on fluoroolefins, by using, instead of the above described acid, the following bifunctional compounds of the present invention:

$$\begin{array}{c} CF_3-CF-O(C_3F_6O)_2-CF-CF_3 \\ | \qquad\qquad\qquad\qquad | \\ COOH \qquad\qquad\qquad COOH \end{array}$$

$$\begin{array}{c} CF_3COCF_2-O-(C_3F_6O)_m-CF-CF_3 \\ \qquad\qquad\qquad\qquad\qquad | \\ \qquad\qquad\qquad\qquad\qquad COOH \end{array}$$

wherein $m$ is 1, 2, 3 or 4

$$\begin{array}{c} CF_2-O(C_2F_4O)_l-CF_2COOH \\ | \\ COOH \end{array}$$

wherein $l$ is 1, 2, 3 or 4

$$\begin{array}{c} CF_2-O(C_2F_4O)_l-(CF_2)_n-CF_2COO \\ | \\ COOH \end{array}$$

wherein both $n$ and $l$ are 1 or 2.

This new class of perfluorinated polyethers having functional groups of a polar and hydrophilic nature at both ends of the chain, therefore find a direct application in the field of the emulsion polymerization of various monomers and in particular of fluorinated olefins, as substitutes for the surface active products of the conventional type, that is, of those having a hydrophilic polar group at only one end of the chain.

EXAMPLE 16

A sample of 1 kg. of the peroxidic polyether obtained by the procedure described in Example F was placed into a 3 liter glass flask fitted with a mechanical stirrer, a reflux condenser and two dropping funnels, immersed in a thermostatically stabilizable bath. One liter of $CF_2ClCFCl_2$ and 0.1 liter of methanol were added thereto and then, within a period of about an hour, 0.4 liter of 57% HI in water and 0.2 liter of methanol were introduced dropwise from the two funnels so as to maintain the mixture at a moderate reflux.

The reaction mixture was then kept boiling gently for another 10 hours, after which the fluorinated organic layer was separated, washed three times with $SO_2$-saturated water and then with water only, dried with $Na_2SO_4$, and finally was concentrated by evaporation of the fluorinated solvent at 100° C. 800 g. of a product were obtained consisting of a mixture of diesters having the following formula:

$CH_3OCOCF_2-O-(CF_2O)_n$
    $-(CF_2CF_2O)_l-CF_2COOCH_3$ wherein the average ratio of the indices $l/n$ is about 0.75. The diester mixture had an average molecular weight, determined by the alkalimetric method, of 450, corresponding to an average value $(n+l)$ of about 2.5.

A sample of 500 g. of said mixture of diesters was subjected to distillation under a vacuum of 2 mm. Hg up to a temperature of 110° C. A residue was obtained of 210 g. of a mixture of diesters having an average molecular weight of 1950, corresponding to an average $(n+l)$ value of about 20.

EXAMPLE 17

1 liter of $CF_2ClCFCl_2$, 0.2 liter of 80% methanol in water and 20 ml. of 57% HI in water were introduced into a 3 liter glass flask, immersed in a thermostatically stabilized bath and fitted with a mechanical stirrer, a reflux condenser and a gas inlet tube reaching to the bottom of the flask. Gaseous $SO_2$ was bubbled into the mixture, which was heated at reflux, at a flow rate between 10 and 20 liter/hr. 1 kg. of peroxidic perfluoropolyether containing 2.1% by weight of peroxidic oxygen obtained as described in Example F was added slowly over a three hour period.

The mixture was then stirred for 8 hours at a temperature of from 43–45° C. and was continuously saturated with $SO_2$. The lower fluorinated layer was then separated and washed repeatedly with water, dried with $Na_2SO_4$, and finally was concentrated by evaporation. The residue consisted of 805 g. of a mixture of the methylesters of dicarboxylic perfluoropolyetheric acids, analogous to that obtained in Example 16.

Similar results were obtained by introducing 80 g. of iron powder instead of feeding in $SO_2$ gas.

EXAMPLE 18

A sample of 13 kg. of peroxidic perfluoropolyether containing 2.1% by weight of peroxidic oxygen, prepared as described in Example F, was introduced into a 10 liter glass vessel fitted with a mechanical stirrer, an inlet feed tube for dry nitrogen reaching to the bottom of the vessel, a thermometer and a gas outlet tube. The temperature of the reaction mass was brought up to 120° C. and then, over a 6 hour period, was increased slowly to 170–175° C., while the mass was continually stirred and the gases produced, consisting mainly of $COF_2$, were vented so as to maintain constant pressure.

After an additional 4 hours at 175° C., an analysis of the product showed that the peroxidic oxygen content had dropped to a value corresponding to 1.1% by weight. 11 kg. of product was obtained having an $r/q$ ratio of 0.75. The average molecular weight did not vary significantly from that of the starting material.

A portion of this product was introduced into a 25 liter polypropylene reactor fitted with a mechanical stirrer, a reflux condenser, a thermometer, two dropping funnels and a cooling jacket containing circulating water at 45° C. 8 liters of $CF_2ClCFCl_2$ and 1 liter of methanol were added to the reactor. 3 liters of methanol and 2 liters of 57% HI in water were added dropwise at the same time over a period of three hours at such a rate as to maintain the reaction mixture at reflux.

After an additional 8 hours, the fluorinated organic layer was separated, washed with $SO_2$-saturated water and then with water only, and dried with $Na_2SO_4$. The $CF_2ClCFCl_2$ solvent was removed by distillation and 8.7 kg. of a mixture of dimethylesters of polyoxa-perfluoroalkan-dicarboxylic acids were obtained, this mixture having an average molecular weight of 1700, determined by saponification with an excess of alkali and back-titration with acid.

The N.M.R. analysis, by balancing the constituent units $CF_2O$ and $CF_2CF_2O$ and the end groups $$-OCF_2COOCH_3,$$

confirmed the average molecular weight already determined by the alkalimetric method, and the absence of peroxidic groups and of end groups having perfluoroalkyl character. The average structure of the reduction product is thus indicated by the formula:

$$CH_3OCOCF_2O-(CF_2O)_n-(CF_2CF_2O)_l-CF_2COOCH_3$$

with an average ratio $l/n$ of 0.7 and an average value of the sum $n+l$ of about 17. The analysis showed, furthermore, that the distribution of the two different units in the chains was random.

A sample of 5 kg. of the diesters was subjected to distillation in a 30 plate distillation column. A fraction, corresponding to 15% by weight of the starting mixture, boiling at 150° C. under 10 mm. Hg, was obtained, which contained all of the possible diesters conforming to the above reported formula, wherein the value of the sum $n+l$ was between 0 and 3. A portion of the mixture of residual diesters from the distillation, amounting to 1 kg., was subjected to a further distillation at a temperature between 40° and 165° C. and under a vacuum of 0.01 mm. Hg. In this way various fractions were obtained at increasing temperatures, which fractions amounted to about 35% by weight of the mixture treated. The residue from this distillation was subjected to molecular distillation at 130° to 270° C., under a vacuum of $1 \times 10^{-5}$ mm. Hg.

Table 2 shows the results from the distillation of the diester mixture after the removal of the initial 15% light product fraction.

A 3 gram sample of fraction No. 2 of said table, having an average molecular weight of 915, was subjected to saponification for 3 hours at 100° C. with 100 cc. of 2 N KOH. At then end, the solution was acidified with 10 cc. of 20% $H_2SO_4$, thereby obtaining the separation of a heavy organic liquid layer which was isolated. The water layer was extracted with ethyl ether, which was added to the organic layer previously separated, and then the solvent was distilled, thereby obtaining a residue, for which the acidimetric I.R. and the N.M.R. analyses agreed in assigning the structure of free dicarboxylic acids corresponding to the starting fraction.

Thhe same process of saponification and recovery of the acids and the recognition analysis were carried out on 2 grams of fraction No. 15, having an average molecular weight of 4340.

Also in this case the structure of free dicarboxylic acids corresponding to the starting fraction was actually determined.

A 2 gram sample of fraction No. 4, having an average molecular weight of 1454, was subjected to saponification with 10 cc. of normal KOH solution for 3 hours at 100° C. At the end, neutralization was carried out with 7.25 cc. of normal $H_2SO_4$ solution, using phenalphthalin, which corresponded to the theoretical consumption of alkali for the formation of the dipotassium salt of the acids corresponding to the starting mixture of fraction No. 4.

TABLE 2

| Fraction number | Distillation range (° C.) | Distilled fraction weight percent | Number average, M.W. | Average $(n+l)$ | Average $(l/n)$ |
| --- | --- | --- | --- | --- | --- |
| 1 | 40–80/0.01 mm | 7.0 | 650 | 4.8 | 0.69 |
| 2 | 80–100/0.01 mm | 7.2 | 915 | 7.8 | 0.74 |
| 3 | 100–115/0.01 mm | 7.5 | 1,215 | 11.3 | 0.71 |
| 4 | 115–130/0.01 mm | 4.1 | 1,454 | 14.1 | 0.69 |
| 5 | 130–150/0.01 mm | 4.0 | 1,670 | 16.5 | 0.70 |
| 6 | 150–165/0.01 mm | 4.0 | 1,830 | 18.5 | 0.68 |
| 7 | $130/1 \times 10^{-5}$ mm | 9.3 | 2,170 | 22.5 | 0.67 |
| 8 | $140/1 \times 10^{-5}$ mm | 5.3 | 2,480 | 26 | 0.68 |
| 9 | $150/1 \times 10^{-5}$ mm | 4.5 | 2,690 | 28 | 0.76 |
| 10 | $160/1 \times 10^{-5}$ mm | 4.5 | 2,900 | 31 | 0.66 |
| 11 | $170/1 \times 10^{-5}$ mm | 4.1 | 3,300 | 35 | 0.75 |
| 12 | $180/1 \times 10^{-5}$ mm | 3.0 | 3,530 | 38 | 0.71 |
| 13 | $190/1 \times 10^{-5}$ mm | 3.1 | 3,870 | 42 | 0.69 |
| 14 | $200/1 \times 10^{-5}$ mm | 3.5 | 4,140 | 45 | 0.71 |
| 15 | $210/1 \times 10^{-5}$ mm | 4.1 | 4,340 | 48 | 0.64 |
| 16 | $220/1 \times 10^{-5}$ mm | 3.5 | 4,760 | 53 | 0.63 |
| 17 | $230/1 \times 10^{-5}$ mm | 3.5 | 5,380 | 60 | 0.65 |
| 18 | $240/1 \times 10^{-5}$ mm | 2.8 | 5,740 | 65 | 0.60 |
| 91 | $250/1 \times 10^{-5}$ mm | 2.1 | 6,300 | 71 | 0.63 |
| 02 | $270/1 \times 10^{-5}$ mm | 2.6 | 6,900 | 78 | 0.64 |
| | Residue | 10.3 | 7,600 | 85 | 0.71 |

To the same solution were added 25 cc. of ethyl ether and 0.5 g. of $AgNO_3$ dissolved in 2 cc. of water. The solution was then left to react for 30 minutes and thereupon there was separated the ether layer, which was evaporated to dryness, leaving behind a residue. The I.R. analysis thereon showed the absence of free acid and a total metal salt formation, while at the same time the silver determination analysis showed an Ag content that was the same as the theoretical for the total salt formation from the acids of the starting mixture.

EXAMPLE 19

A sample of 7 kg. of the perfluoropolyether peroxide containing 2.4% by weight of active oxygen, prepared as described in Example (G), was subjected to heating from 100° C. to 170° C. within a period of 3 hours, and was then maintained at 170° C. for 3 hours and 30 minutes in the vessel described in Example 18.

At the end, the residual oil, 5.5 kg., showed a peroxidic oxygen content of about 1% by weight of active oxygen, while the ratio $r/q$ had dropped to about 1.5.

A sample of 5 kg. of the heat treated product was introduced into a cylindrical 15 liter polypropylene reactor fitted with a reflux condenser, a mechanical stirrer, a thermometer, a dropping funnel and an inlet feed tube for gases reaching to the bottom of the reactor, as well as with a jacket containing circulating water at 45° C.

Into this reactor were then introduced 4 liters of $CF_2ClCFCl_2$, 2 liters of 80% methanol and 0.2 liter of 57% HI in water. Thereupon, under stirring of the mass, gaseous $SO_2$ was bubbled into the mixture for 10 hours at a flow rate of 10 liters/hr.

After 15 hours of reaction, the fluorinated organic layer was separated and washed with water saturated with $SO_2$ and then with water. It was then dried on $Na_2SO_4$ and concentrated by evaporation of the solvent. The residual 4.3 kg., consisting of a mixture of diesters of polyoxyperfluoralkan-dicarboxylic acids, had an average molecular weight of 1600, as determined by alkalimetric titration and confirmed by N.M.R. analysis.

The N.M.R. spectrum indicated an average structure of the reduction product expressed by the formula:

$$CH_3OOC-CF_2-O-(C_2F_4O)_l-(CF_2O)_n-CF_2-COOCH_3$$

with an average ratio of $l/n$ of about 1.35, and an average value of the sum $(n+l)$ of about 14.

A 4 kg. sample of the reduced product mixture was subjected to distillation, thereby separating a first 10% fraction having a distillation range from 50° to 110° C., under a reduced pressure of 0.2 mm. Hg, and an alkalimetric average molecular weight of 570, and then separating a second 10% fraction having a distillation range from 110° to 150° C., under a reduced pressure of from 0.2 to 0.05 mm. Hg, and an average molecular weight of 900, while the residue from this distillation had an average molecular weight of about 2300, as determined by the alkalimetric method.

The first fraction was then subjected to rectification in a 30 plate distillation column. Various fractions were obtained therefrom and from each of them were isolated by gas-chromatography some diesters with a purity between 97% and 99%, amongst which there were:

(1)      $O(CF_2COOCH_3)_2$      (20 g.)

(2) 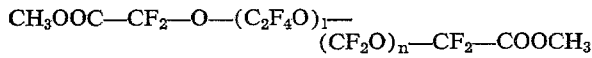 (12 g.)

(3) $CF_2-O-C_2F_4O-CF_2COOCH_3$
    $|$
    $COOCH_3$      (15 g.)

(4) $CF_2-O(C_2F_4O)_2-CF_2COOCH_3$
    $|$
    $COOCH_3$      (7 g.)

(5) $CF_2-O-CF_2O-C_2F_4O-CF_2COOCH_3$
    $|$
    $COOCH_3$      (9 g.)

3 gram samples of the discarboxylic esters indicated by the numbers 2, 3, 4 and 5, were saponified with 20 cc. of 2 normal NaOH at 100° C. for 3 hours. At the end, acidification was carried out with 5 cc. of 20% $H_2SO_4$ and the samples were then extracted twice with 10 cc. of ethyl ether. The ether layers were dried on $Na_2SO_4$ and the solvent was evaporated, thereby obtaining as residues the following products in the corresponding sequence

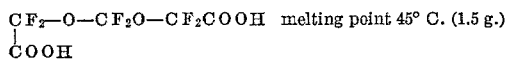 melting point 45° C. (1.5 g.)

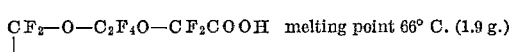 melting point 66° C. (1.9 g.)

$CF_2-O(C_2F_4O)_2-CF_2COOH$
$|$
$COOH$      melting point 61° C. (2.1 g.)

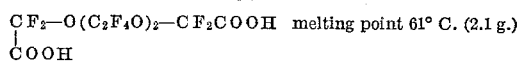 boiling temp. 135°-137° C. under 0.05 mm. Hg (2.5 g.)

Acidimetric, N.M.R. and IR analyses confirmed the structure of the above reported acids.

A 3 g. sample of the dimethyl ester of 3,6-dioxa-perfluorosuberic acid was dissolved in 10 cc. of anhydrous ethyl ether and was then cooled down to 0° C. By treating this solution gently with gaseous anhydrous $NH_3$, there was obtained a precipitate which was filtered from the ether, and washed with ethyl ether, and which had a melting point of 170° C. The IR spectrum and the N.M.R. spectrum were in accordance with the formula:

$CF_2-O-C_2F_4O-CF_2CONH_2$
$|$
$CONH_2$

A 2 gram sample of 3,5,8-trioxa-perfluoro-sebacic acid was treated with 2 cc. of $SOCl_2$ at reflux temperature, in the presence of 0.1 cc. of pyridine. After 5 hours of reaction, the thionyl chloride was removed by distillation and there were obtained 1.5 g. of a product which was again distilled, thereby separating 1 gram of a fraction having a boiling point of 162°–164° C. (750 mm. Hg.), for which the acidimetric and chlorides analyses as well as the I.R. and N.M.R. spectra confirmed the structure according to the formula:

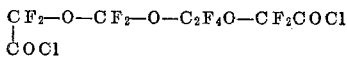

A 100 gram sample of the second distillation fraction of the reduced product mixture, having a distillation range between 110° and 150° C. under a reduced pressure of 0.2–0.05 mm. Hg and an average molecular and an average molecular weight of 900, was dissolved in 200 cc. of ethyl ether and then treated at 0° C. with anhydrous $NH_3$. When, after two hours, no further absorption of ammonia could be observed, the ether and the alcohol formed in the reaction were evaporated. IR analysis confirmed that the residue had been completely converted into the diamide.

To this residue 90 g. of $P_2O_5$ were added and the mixture was thoroughly mixed and then gradually heated up to 150°–200° C. for 5 hours. At the end, a reduced pressure of 0.02 mm. Hg was applied and a liquid was distilled at a temperature between 100° and 165° C.

80 grams of liquid were collected on which N.M.R. analysis determined the presence of $-CF_2O-$ and $-C_2F_4O-$ units as well as of the $-OCF_2-(CN)$ terminal groups, while analysis of the IR spectrum showed the presence absorption bands corresponding to the nitrile group in the 2.250 cm.$^{-1}$ zone and the absence of those of the amide group in the zones 1.700–1.720 cm.$^{-1}$ and 1.620–1.630 cm.$^{-1}$.

Variations can, of course, be made without departing from the spirit and scope of the invention.

Having thus described our invention, what we desire to secure and claim by Letters Patent is:

1. Bifunctional perfluorinated polyethers and mixtures thereof, having chemically reactive terminal groups at both ends of the chain, said polyethers having from 1 to 100 repeating units selected from the group consisting of $-C_3F_6O-$, $-C_2F_4O-$, and $-CF_2O-$, wherein $C_3F_6$ and $C_2F_4$ are perfluoroalkylene units derived from the opening of the double bond of a hexafluoropropylene and of a tetrafluoroethylene molecule, respectively, the different oxyperfluoroalkylene units having a random distribution along the chain, there being no more than 50 of any one of said species of repeating units, said $-CF_2O-$ repeating units being present only when either or both of said $-C_2F_4O-$ and $C_3F_6O-$ repeating units are present, said $-C_2F_4O-$ units being present only when said $-CF_2O-$ units are also present, said $C_3F_6O-$ units being present only when either said —CF$_2$O— units are also present or when said polyether contains a $$-CF_2-CO-CF_3$$

terminal group bonded to said chain through an ether oxygen, said polyether having terminal groups bonded to said chain through an ether oxygen, said terminal groups being selected from the group consisting of $$-CF_2COOH, -\underset{\underset{CF_3}{|}}{C}-CFCOOH, \text{ and } -CF_2-CO-CF_3,$$

and —CF$_2$—CO—CF$_3$ at least one of the latter two terminal groups being present when —C$_6$F$_6$O— repeating units are present, with the further proviso that when said —CF$_2$CO—CF$_3$ terminal group is present, one of said other two terminal groups is also present, and the corresponding acyl halides, lower alkyl esters and metal salts.

2. The perfluorinated mixtures of polyethers of claim 1 having from 1 to 50 —CF$_2$O— units, from 1 to 50 —C$_2$F$_4$O— units, no —C$_3$F$_6$O— units and a total of between 2 and 85 repeating units, the average ratio of —C$_2$F$_4$O— units to —CF$_2$O— units being from about 0.2 to about 5, and their corresponding acyldihalides, lower alkyl diesters, and di-metal salts.

3. The perfluorinated mixtures of polyethers of claim 2, wherein the average ratio of —C$_2$F$_4$O— units to $$-CF_2O-$$

units is from about 0.5 to about 1.5.

4. The perfluorinated polyethers of claim 1 having from 1 to 5 —CF$_2$O— units and from 1 to 5 —C$_2$F$_4$O— units.

5. The polyethers of claim 1 wherein the total number of repeating units is between 1 and 85.

6. The polyethers of claim 5 wherein the total number of repeating units is between 1 and 50.

7. The perfluorinated polyethers of claim 1 having the formula $$HOOC-\underset{\underset{CF_3}{|}}{CF}-O-\left(CF_2-\underset{\underset{CF_3}{|}}{CF}-O\right)_m-CF_2-CO-CF_3$$

wherein $m$ is an integer from 1 to 4.

8. A process for preparing bifunctional perfluorinated ether polymers and mixtures thereof, having chemically reactive terminal groups at both ends of the chain, said ether polymers having from 0 to 100 repeating units selected from the group consisting of —C$_3$F$_6$O—, $$-C_2F_4O-,$$

and —CF$_2$O—, wherein C$_3$F$_6$ and C$_2$F$_4$ are perfluoroalkylene units derived from the opening of the double bond of a hexafluoropropylene and of a tetrafluoroethylene molecule, respectively, the different oxyperfluoroalkylene units having a random distribution along the chain, there being no more than 50 of any one of said species of repeating units, said ether polymer having terminal groups bonded to said chain through an ether oxygen, said terminal groups being selected from the group consisting of $$-CF_2COOH, -\underset{\underset{CF_3}{|}}{C}FCOOH, \text{ and } -CF_2-CO-CF_3,$$

said latter two terminal groups being present only when said —C$_3$F$_6$O—repeating units are present and both said latter two terminal groups being present when only —C$_3$F$_6$O— units are present, with the further proviso that when said —CF$_2$—CO—CF$_3$ terminal group is present, one of said other two terminal groups is also present, and the corresponding acyl halides, esters and metal salts, said process comprising reacting a reducing agent, at a temperature of from about −30° C. to 250° C., under a pressure between about 1 and 200 atmospheres, in the presence or absence of a solvent or a dispersing agent, with a perfluorinated linear polyether containing peroxidic oxygen bridges, or a mixture of said polyethers, said peroxidic oxygen-containing polyether having at least about 10 repeating units selected from the group consisting of —C$_3$F$_6$O—, —C$_2$F$_4$O—, and —CF$_2$O—, wherein C$_3$F$_6$ and C$_2$F$_4$ are perfluoroalkylene units derived from the opening of the double bond of a hexafluoropropylene and of a tetrafluoroethylene molecule, respectively, said repeating units being randomly distributed along the chain and linked one to another either directly or through an oxygen atom whereby a peroxy group is present at random along the chain, there being no more than 100 of any one of said species of repeating units and from 1 to 90 of said randomly distributed peroxy groups in said chain, the ratio of the total peroxy groups to the sum of the total —C$_3$F$_6$O— units plus total —C$_2$F$_4$O— units plus total —CF$_2$O— units being between about 0.01 and 0.9, the sum of the total —C$_3$F$_6$O— units plus total —C$_2$F$_4$O— units being greater than the total number of peroxy groups, said polyether having terminal groups bonded to said chain through an ether oxygen, said terminal groups being selected from the group consisting of $$-CF_3, \ CF_3-O-\underset{\underset{CF_3}{|}}{CF}-, \ -COF, \ -CF_2-COF, \ -\underset{\underset{CF_3}{|}}{CF}-COF,$$

and —CF$_2$—CO—CF$_3$, and their corresponding acyl halides, esters and metal salts; said reducing agent being selected from the group consisting of molecular hydrogen; nascent hydrogen; primary and secondary alcohols alone or in the presence of aluminum alcoholates; simple hydrides; boron and aluminum complex hydrides; sulfur dioxide, hydrogen sulfide and the alkali metal salts thereof; hydrazine; hydroxylamine; phosphorous acid, hypophosphorous acid and the alkali metal salts thereof; iron; tin; stannous chloride; hydroiodic acid, and a complex reducing agent formed by a mixture of 57% aqueous hydroiodic acid with iron or gaseous SO$_2$.

9. The process of claim 8 wherein the reaction product comprises at least one linear polyether having the formula $$FOC-\underset{\underset{CF_3}{|}}{CF}-O-\left(CF_2-\underset{\underset{CF_3}{|}}{CF}-O\right)_m-CF_2-CO-CF_3$$

wherein $m$ is an integer from 1 to 10, said starting peroxidic polyether having only —C$_3$F$_6$O— repeating units and a ratio of peroxy groups to —C$_3$F$_6$O— repeating units between about 0.01 and 0.9.

10. The process of claim 8 wherein the reaction product comprises at least one linear polyether having both —C$_2$F$_4$O— and —CF$_2$O— repeating units wherein the ratio of the total —CF$_2$O— repeating units plus one to the total —C$_2$F$_4$O— repeating units plus one is from about 0.16 to 6, said starting peroxidic polyether containing both —CF$_2$O— and —C$_2$F$_4$O— repeating units, the ratio of the total —CF$_2$O— units to the total —C$_2$F$_4$O— units being from 0.1 to 100, and the terminal groups being selected from the group consisting of —CF$_3$, —COF and —CF$_2$—COF.

11. The process of claim 8 wherein the total number of repeating units in said peroxidic oxygen-containing polyether is between about 10 and 100.

12. The process of claim 8 wherein the ratio of the total number of peroxy groups to the total number of repeating units in said peroxidic oxygen-containing polyether is between about 0.1 and 0.5.

13. The process of claim 8 wherein said reaction temperature is between about 20° and 100° C.

14. The process of claim 8 wherein said reaction pressure is between about 1 and 100 atmospheres.

15. The process of claim 8 wherein said reduction reaction is carried out in the presence of a solvent or dispersing agent which is inert towards the reactants used and towards the terminal group $$-CF_2-CO-CF_3, -CF_2 \text{ and } -\underset{\underset{CF_3}{|}}{CF}-COF.$$

16. The process of claim 15 wherein said starting peroxidic polyether contains at least one terminal group —CF$_2$—CO—CF$_3$ or at least one perfluoropropylene unit adjacent to a peroxidic bridge and linked to it by the tertiary carbon atom, whereby said bifunctional perfluorinated ether polymer product comprises at least one polyether containing one —CF$_2$—CO—CF$_3$ terminal group, the remaining terminal groups being selected from the group consisting of —CF$_2$—COF and —CF—COF.
                    |
                    CF$_3$ 17. The process of claim 15, wherein the starting peroxidic polyether contains at least one peroxidic group directly linked to the secondary carbon atom of the perfluoropropylene unit, whereby at least one bifunctional polyether reaction product has one

—CF—COF
|
CF$_3$ terminal group, the remaining terminal groups being selected from the group consisting of —CF$_2$—CO—CF$_3$ and —CF$_2$—COF.

18. The process of claim 15 wherein said starting peroxidic polyether consists of a polyether in which there is no —C$_3$F$_6$O— repeating unit and wherein there is no —CF$_2$—CO—CF$_3$ terminal group, whereby said bifunctional perfluorinated ether polymer product comprises at least one polyether containing a —CF$_2$—COF terminal group.

19. The process of claim 15 wherein said solvent or dispersing agent is selected from the group consisting of hydrocarbons, chlorinated hydrocarbons, chlorofluorinated hydrocarbons, fluorinated and perfluorinated hydrocarbons, and linear and cyclic ethers and their perfluorinated derivatives.

20. The process of claim 8 wherein said reducing agent is molecular hydrogen in the presence of an hydrogenation catalyst selected from the group consisting of palladium, platinum and nickel in the form of metal in a finely subdivided state or supported on carbon or alumina, said reaction temperature is from about 0° C. to 200° C.

and said reaction pressure is from about 1 to 200 atmospheres.

21. The process of claim 20 wherein said reaction temperature is from about 20° C. to 100° C.

22. The process of claim 20 wherein said reaction pressure is from about 5 to 100 atmospheres.

23. The process of claim 8 wherein said reducing agent is hydriodic acid in the presence of a liquid selected from the group consisting of water, acetic anhydride, methanol, ethanol, trifluorotrichloroethane and mixtures thereof.

24. The process of claim 8 wherein said reducing agent is formed by a mixture of 57% aqueous HI with gaseous SO$_2$, and the reaction is carried out in the presence of a solvent mixture consisting of methyl alcohol and CF$_2$Cl—CFCl$_2$ 25. The process of claim 8 wherein said reducing agent is formed by mixture of 57% HI with iron and the reaction is carried out in the presence of a solvent mixture consisting of methyl alcohol and CF$_2$ClCFCl$_2$.

References Cited

UNITED STATES PATENTS

| 3,250,806 | 5/1966 | Warnell | 260—535 H |
| 3,442,942 | 5/1969 | Liances et al. | 260—535 H |

FOREIGN PATENTS

| 6504428 | 10/1965 | Netherlands | 260—535 H |

LORRAINE A. WEINBERGER, Primary Examiner

P. J. KILLOS, Assistant Examiner

U.S. Cl. X.R.

260—32.2, 32.4, 78 R, 78.3 R, 348.5 R, 465.6, 483, 484 R, 484 P, 496, 535 P, 544 Y, 544 F, 561 HL, 594, 610 B, 615 BF

UNITED STATES PATENT OFFICE
CERTIFICATE OF CORRECTION

Patent No. 3,847,978            Dated November 12, 1974

Inventor(s) DARIO SIANESI, GERARDO CAPORICCIO, DOMENICO MENSI

It is certified that error appears in the above-identified patent and that said Letters Patent are hereby corrected as shown below:

Column 25, lines 9-11:

"$-CF_2COOH$, $-\underset{\underset{CF_3}{|}}{C}-CFCOOH$, and $-CF_2-CO-CF_3$, and $-CF_2-CO-CF_3$" should read -- $-CF_2COOH$, $-\underset{\underset{CF_3}{|}}{C}FCOOH$, and $CF_2-CO-CF_3$, --

Signed and Sealed this twenty-third Day of March 1976

[SEAL]

Attest:

RUTH C. MASON
Attesting Officer

C. MARSHALL DANN
Commissioner of Patents and Trademarks